Patented May 15, 1951

2,553,331

UNITED STATES PATENT OFFICE 2,553,331

METHACRYLONITRILE PROCESS

Erhard John Prill, Cresskill, N. J., assignor to Allied Chemical & Dye Corporation, New York, N. Y., a corporation of New York No Drawing. Application July 29, 1948, Serial No. 41,395

4 Claims. (Cl. 260—465.9)

This invention relates to the conversion of isobutylene-nitrosyl chloride adduct to methacrylonitrile.

The dehydrochlorination of the above adduct has previously been accomplished with agents such as alkali metal salts of acetic acid. To the best of my knowledge, however, isobutylene-nitrosyl chloride adduct has not heretofore been dehydrochlorinated as described below, nor has methacrylonitrile been obtained from isobutylene-nitrosyl chloride adduct as described below or otherwise.

I have found that when isobutylene-nitrosyl chloride adduct is heated in a liquid reaction mixture with an aromatic tertiary nitrogen base and with a fatty acid anhydride methacrylonitrile is formed. The use of the base simultaneously with the fatty acid anhydride, and the use of an aromatic tertiary nitrogen base rather than some other basic material are both important features of my process contributing to the high yields of methacrylonitrile obtained.

In pure form the isobutylene-nitrosyl chloride adduct referred to herein is a crystalline solid having an elementary composition corresponding to the empirical formula $C_4H_8NOCl$. On the basis of its molecular weight in benzene solution the product is bimolecular. This fact combined with its showing an ultraviolet absorption spectrum characteristic of the nitroso group indicates that the solid adduct should be regarded as a bis-nitroso compound. The melting point of the solid adduct recrystallized from benzene is about 104° C. (with decomposition). Methods for the preparation of this solid have been described in the art, for example U. S. P. 2,394,430 of February 5, 1946 to Crowder et al. The above-discussed compound is referred to herein as isobutylene-nitrosyl chloride adduct.

In my process described herein it is not essential that the pure adduct be treated. For example, in my process for methacrylonitrile the treatment of the total crude product of the isobutylene-nitrosyl chloride reaction including the liquid by-product is permissible but only slightly increases the total amount of methacrylonitrile obtained as compared to the amount obtained from the isolated solid adduct. The fact that the adduct is more stable in purified form than in crude form is a reason for preferring to employ the purified adduct as starting material for my process.

Solid isobutylene-nitrosyl chloride adduct separated by filtration from the liquid by-product and recrystallized from benzene or simply washed with e. g. petroleum ether and air-dried is a satisfactory starting material. The liquid by-product of the isobutylene-nitrosyl chloride reaction may be treated by my process for methacrylonitrile production separately from the main crystalline product and will yield some methacrylonitrile but the methacrylonitrile yield from the liquid by-product is relatively low compared to that from the crystalline product.

The aromatic tertiary nitrogen bases referred to herein are nitrogen-containing organic bases in which the nitrogen atoms are joined only to carbon atoms, at least one of which is a carbon atom of an aromatic ring; but others may be aliphatic or alicyclic carbon atoms. It is not necessary that the bases be pure. Thus suitable aromatic tertiary nitrogen bases are obtained, for example, from coal tar as fractions of varying purity. Among suitable bases are pyridine, quinoline, isoquinoline, quinaldine, a collidine, a picoline, a lutidine, and dimethyl aniline.

Bases such as γ collidine, 2,4-lutidine, quinoline and quinaldine plus a dehydrating agent generally give higher yields of methacrylonitrile from isobutylene-nitrosyl chloride adduct by my process than do bases which lack a ring nitrogen atom and a hydrocarbon radical substituent in the position alpha to the nitrogen atom, e. g. isoquinoline, pyridine, and dimethyl aniline. But these other tertiary bases are also operative.

For maximum yields of methacrylonitrile at least sufficient base should be present to combine with the hydrogen chloride content of the isobutylene-nitrosyl chloride adduct. An excess of base over this amount does no particular harm. For example, an advantageous mode of carrying out my reaction batchwise or semi-continuously involves adding the isobutylene-nitrosyl chloride adduct in small portions to the total amount of base to be employed in each reaction cycle, so that a considerable excess of base is present throughout most of the reaction.

However, the reaction may be carried on in the presence of less than the amount of base equivalent to the hydrogen chloride of the adduct. In such operations the proportion of α-chloriso-butyronitrile accompanying the methacrylonitrile product will be greater than when the amount of base present is at least equivalent to the hydrogen chloride of the adduct.

The fatty acid anhydrides which may be used as dehydrating agent in my process are anhydrides of saturated or unsaturated open-chain monobasic acids which have a hydrocarbon radical attached to the carbonyl group. There is nothing critical about the choice of a particular fatty acid anhydride suitable for my process, and in fact a wide variety of dehydrating agents other than fatty acid anhydrides may be used. Fatty acid anhydrides are particularly adapted for use in the process because, among other reasons, the acids formed therefrom by reaction with the $H_2O$ content of the adduct are weak acids compared to hydrochloric acid and, therefore, do not interfere with the functioning of the base as a dehydrochlorinating agent. Acetic anhydride is representative of fatty acid anhydrides and is readily available for use in my process. Other representative fatty acid anhydrides which may be employed are propionic anhydride, butyric anhydride, valeric anhydride, heptanoic anhydride, caprylic anhydride and their isomers.

The mol ratio of fatty acid anhydride dehydrating agent to isobutylene-nitrosyl chloride adduct employed in my process is suitably one equivalent of dehydrating agent per mol of $H_2O$ which can be formed from the quantity of adduct taken as starting material (i. e. one mol of acid anhydride per mol of adduct regarded as a monomer). However, an excess of dehydrating agent, for example two mols of acid anhydride per mol of water to be removed from the adduct, may be used with no adverse effect on yield. Or the full amount of acid anhydride required for one reaction cycle may be present in a reaction mixture to which the isobutylene-nitrosyl chloride adduct is supplied in successive small portions, so that a large excess of dehydrating agent is present during most of the reaction.

Temperatures suitable for carrying out my reaction are from about 30° to 200° C. The most suitable temperature range to be employed depends to some extent on other conditions selected for the reaction, but is in any case not a highly critical factor. When acetic anhydride, for example, is the dehydrating agent the effect of temperature variation between about 120° and about 200° C. on the yield of methacrylonitrile is small: a yield over this temperature range uniformly between 84 and 88 mol percent of methacrylonitrile based on the starting adduct may be obtained.

The temperatures preferably employed are high enough to effect rapid interaction between the reactants and avoid any considerable accumulation of reactants in either a continuous or a batchwise operation, as accumulated reactants may enter into sudden and violent reaction. A suitable temperature for reaction is usually one at which methacrylonitrile distils out of the reaction mixture; but the most suitable reaction temperaure will, of course, be governed in part by the particular combination of base and acid anhydride being employed in my process. When one of the preferred bases is employed in my process the temperatures of reaction will in general be maintained at or below the boiling point of the base at atmospheric pressures.

Methacrylonitrile is not greatly affected by the reaction mixture formed in my process under reaction conditions. Accordingly, the time of contact between the reactants, while it should be long enough for reaction to occur, may exceed the time required for reaction. A preferred mode of carrying out my process involves continuously removing the volatile reaction products from the reaction zone, e. g. by distillation, as fresh reactants are introduced; but, if desired, the products may instead be separated batchwise from the reaction mixture after the full amount of all reactants for one reaction cycle has been brought into reaction.

The following examples are illustrative of the process of my invention but are to be understood as illustrative only and not as limiting the scope of the invention:

*Example 1.*—121.5 grams of isobutylene-nitrosyl chloride adduct recrystallized from benzene and 108 grams of 95% acetic anhydride (1.005 mols acetic anhydride per mol of adduct regarded as a monomer) were formed into a thick paste and were then added portionwise from a water-cooled, stoppered tube to 136 grams (1.05 mols) of a quinoline fraction of coal tar origin, boiling substantially within 2° C. including 237.4° C., which had been brought to 160° C. and was maintained at that temperature. Volatile products were continuously distilled over from the reaction vessel into a receiver provided with a reflux condenser. The introduction of the adduct took about 20 minutes.

The reaction vessel was purged at the end of the run by adding water which distilled out, and then the combined distillates collected in the receiver were fractionated in the presence of hydroquinone inhibitor through a column of about 10 theoretical plates with water as azeotropic agent. A main fraction boiling from about 73–77° C. and a higher boiling fraction boiling up to about 99° C. were collected. The first fraction consists very largely of the azeotropic mixture of water and methacrylonitrile which mixture boils at 76.5° C. The second fraction contains methacrylonitrile, α-chlorisobutyronitrile and water.

The methacrylonitrile azeotrope separates into an aqueous and an organic layer. The organic layer typically contains about 95% methacrylonitrile, 2% methacrolein (characterized via its 2,4-dinitrophenyl hydrazone) and 2% water. The methacrylonitrile may be further purified, for example, by redistillation. The methacrylonitrile and α-chlorisobutyronitrile contents of the fractions containing these compounds were estimated from the nitrogen content (Kjeldahl method) and the chlorine content (Parr method).

The yield of methacrylonitrile obtained by the procedure of the above example was about 88 mol percent of theory and the amount of α-chlorisobutyronitrile formed was about 2.2 mol percent of theory based on the adduct taken at the start.

The α-chlorisobutyronitrile is a side product of these reactions and not an intermediate: it is not dehydrochlorinated or otherwise appreciably affected when subjected to the above reaction conditions.

In a series of three experiments under conditions the same as just described except that the reaction temperatures were 120°–125° C., 140° C., and 200° C. the yields of methacryonitrile were 84.2, 85.3, and 85 mol percent and the amounts of α-chlorisobutyronitrile formed were 2, 1.3, and 2.8 mol percent on starting adduct.

A quinaldine fraction employed in the same manner gave about an 87 mol percent yield on the adduct of methacrylonitrile and about 1–2 mols percent of α-chlorisobutyronitrile by-product. An isoquinoline fraction when substituted for the quinoline or quinaldine in the above procedure gave substantial but lower yields of methacrylonitrile.

*Example 2.*—A slurry was formed with stirring from 121.5 grams of isobutylene-nitrosyl chloride adduct recrystallized from benzene, 108 grams of 95% acetic anhydride, and 272 grams of a quinoline fraction of coal tar origin, boiling substantially within 2° C. including 237.4° C. (i. e. 2.1 mols of quinoline and 1.005 mols of acetic anhydride per mol of adduct regarded as a monomer) in a dropping funnel surrounded by a cooling can which permitted maintaining the temperature of the slurry below 20° C. Small portions of this reaction mixture were then passed down a glass heating coil with an electrically heated jacket containing boiling α-pinene (boiling point 155° C.). The reaction appeared complete in each successive portion in about 1.5 seconds, after the portion had traversed about ¼ of the heating coil. The non-volatile products were collected in a first receiver maintained at temperatures from about 0° to 20° C. and disposed beneath the heating coil, while volatile products distilled continuously from the first receiver into a second receiver fitted with a reflux condenser where they were collected. The reaction products were recovered from the receivers, separated and analyzed as in Example 1.

The methacrylonitrile yield obtained by the procedure of the above example was about 82 mol percent on the adduct taken as starting material and the amount of α-chlorisobutylronitrile formed was about 6 mol percent.

When a 2,4-lutidine fraction was employed instead of quinoline using 2 mols of lutidine per mol of adduct as monomer and in all other respects the same procedure as in the above example, a 77 mol percent yield on the adduct of methacrylonitrile was obtained along with 0.6 mol percent of α-chlorisobutyronitrile.

When a γ-collidine fraction was used instead of the lutidine above in the procedure of the above example, the yield, based on the adduct, of methacrylonitrile was about 77 mol percent and the amount of α-chlorisobutyronitrile formed was about 1.3 mol percent. Pyridine and N,N-dimethylaniline gave substantial but lower yields of methacrylonitrile.

Various procedures may be employed in carrying out my process of heating together isobutylene-nitrosyl chloride adduct, a tertiary nitrogen base and a fatty acid anhydride to obtain high yields of methacrylonitrile. The adduct and the fatty acid anhydride may be mixed in the cold and added to hot liquid base as in Example 1 above. Or the adduct and the fatty acid anhydride may be brought together into solution, e. g. by warming a mixture of the two or by using a solvent such as methylene chloride; the solution is then added slowly to the hot liquid base. So long as the temperature of the adduct-fatty acid anhydride solution is low enough to avoid a reaction between these two ingredients in the solution the results of this solution method are substantially the same as obtained by the method of mixing the adduct and the acid anhydride in the cold to form a paste.

Another suitable procedure is to mix all the ingredients in the cold and then pass the mixture through a heated reaction zone as in Example 2 above. Or adduct alone or in solution, e. g. in chloroform, may be introduced into a hot liquid mixture of the base and the fatty acid anhydride.

The methacrylonitrile product may be recovered by various methods, e. g. by continuous distillation out of the reaction mixture followed by fractionation of the distillate suitably in the presence of water, or by adding water to the cooled reaction mixture and then extracting, e. g. with ether, drying, and fractionating the ether extract. Suitably a polymerization inhibitor such as hydroquinone is present during the distillations.

The acid formed from the anhydride used in my reaction may be recovered e. g. by acidifying all residues and distilling out the acid if it is volatile, or by other means. The tertiary nitrogen base employed in my process appears in the distillation residues in the form of its salts with hydrogen chloride produced during the reaction. The base may be largely recovered by adding to the distillation residues a strong base such as aqueous sodium hydroxide, separating the displaced nitrogen base from the resulting aqueous salt solution, e. g. by decantation and drying the nitrogen base. This recovered base may then be reused in my process.

I claim:

1. The process for the production of methacrylonitrile which comprises heating under atmospheric pressures a liquid reaction mixture containing isobutylene-nitrosyl chloride adduct and at least a molar equivalent, based on said adduct regarded as a monomer, of an aromatic tertiary nitrogen base containing the pyridine ring and having a hydrocarbon radical attached to at least one of the alpha carbon atoms of the pyridine ring and at least a molar equivalent, based on said adduct regarded as a monomer, of a fatty acid anhydride, at temperatures at which methacrylonitrile formed by reaction between the said reactants distils out of the reaction mixture.

2. A process in accordance with claim 1 in which the aromatic tertiary nitrogen base is a quinoline fraction, the fatty acid anhydride is acetic anhydride, and the reaction temperatures are at least about 120° C. but are not above the boiling point of the quinoline fraction.

3. A process in accordance with claim 1 in which the aromatic tertiary nitrogen base is a quinaldine fraction, the fatty acid anhydride is acetic anhydride, and the reaction temperatures are at least about 120° C. but are not above the boiling point of the quinaldine fraction.

4. A process in accordance with claim 1 in which the aromtic tertiary nitrogen base is a 2,4-lutidine fraction, the fatty acid anyhydride is acetic anhydride, and the reaction temperatures are at least about 120° C. but are not above the boiling point of the 2,4-lutidine fraction.

ERHARD JOHN PRILL.

REFERENCES CITED

The following references are of record in the file of this patent:

UNITED STATES PATENTS

| Number | Name | Date |
|---|---|---|
| 2,037,389 | Nicodemus et al. | Apr. 14, 1936 |
| 2,328,984 | Lichty | Sept. 7, 1943 |
| 2,375,005 | Kung | May 1, 1945 |
| 2,387,435 | Fleysher | Oct. 23, 1945 |
| 2,394,430 | Crowder et al. | Feb. 5, 1946 |
| 2,417,024 | Tuerck et al. | Mar. 4, 1947 |
| 2,417,749 | Hagemeyer | Mar. 18, 1947 |
| 2,471,928 | Bortnick et al. | May 31, 1949 |
| 2,471,994 | Wooster | May 31, 1949 |

OTHER REFERENCES

Tilden et al., J. Chem. Soc. (London), vol. 65, pp. 324–326, 333 (1894).

Drew et al., J. Chem. Soc. (London), 1934, pp. 49–50.

Mowry et al., J. Am. Chem. Soc., vol. 69, p. 1831 (1947).

Mowry, "Chem. Reviews," vol. 42, pp. 250–256 (1948).